US012571320B2

(12) United States Patent
Garnica

(10) Patent No.: US 12,571,320 B2
(45) Date of Patent: Mar. 10, 2026

(54) TURBINE BLADE TIP GEOMETRY SYSTEM AND METHOD FOR GAS TURBINE ENGINE

(71) Applicant: HONEYWELL INTERNATIONAL INC., Charlotte, NC (US)

(72) Inventor: Isaac Garnica, Phoenix, AZ (US)

(73) Assignee: HONEYWELL INTERNATIONAL INC, Charlotte, NC (US)

( * ) Notice: Subject to any disclaimer, the term of this patent is extended or adjusted under 35 U.S.C. 154(b) by 0 days.

(21) Appl. No.: 18/736,164

(22) Filed: Jun. 6, 2024

(65) Prior Publication Data

US 2025/0376927 A1 Dec. 11, 2025

(51) Int. Cl.
*F01D 5/20* (2006.01)
*F01D 5/18* (2006.01)
*F01D 11/08* (2006.01)

(52) U.S. Cl.
CPC ............... *F01D 5/20* (2013.01); *F01D 5/187* (2013.01); *F01D 11/08* (2013.01); *F05D 2220/32* (2013.01); *F05D 2240/127* (2013.01); *F05D 2240/307* (2013.01); *F05D 2250/70* (2013.01)

(58) Field of Classification Search
CPC ....... F01D 5/20; F01D 5/187; F05D 2240/307
See application file for complete search history.

(56) References Cited

U.S. PATENT DOCUMENTS 5,476,363 A * 12/1995 Freling ..................... F01D 5/20 29/889.7
5,476,364 A * 12/1995 Kildea .................... F01D 5/186 416/95
5,525,038 A * 6/1996 Sharma ..................... F01D 5/20 416/235
6,086,328 A * 7/2000 Lee ........................... F01D 5/18 416/235
7,217,101 B2 5/2007 Harvey
8,167,567 B2 * 5/2012 Kirchner ................... F01D 5/12 416/243
8,480,372 B2 * 7/2013 Sparks .................... F01D 11/08 416/243
8,894,376 B2 * 11/2014 Penny ..................... F01D 5/141 416/228
8,920,124 B2 12/2014 Lee
9,353,632 B2 5/2016 He et al.
9,856,739 B2 1/2018 Bedrosyan et al.
(Continued)

FOREIGN PATENT DOCUMENTS

CN 115875086 A 3/2023

*Primary Examiner* — Eldon T Brockman
(74) *Attorney, Agent, or Firm* — Ingrassia, Fisher & Lorenz LLP

(57) ABSTRACT

Systems and methods for a gas turbine engine include a rotor having a rotor blade that has a base, a tip, and an outer surface defined by a leading edge, a trailing edge, a suction side wall, and a pressure side wall, all extending between the base and the tip. Geometry of the tip of the rotor blade has a contour that is directed first toward the suction side wall at the leading edge, and then toward one of the pressure side wall or the suction side wall at the trailing edge. The geometry has a maintained or contracted shape that is shifted toward the suction side wall. The geometry is configured to reduce tip leakage interaction of the rotor to delay onset of tip vortex generation and desensitize the rotor to tip clearance.

20 Claims, 9 Drawing Sheets

(56) References Cited

U.S. PATENT DOCUMENTS

| | | | | |
|---|---|---|---|---|
| 10,233,758 | B2 | 3/2019 | Duong et al. | |
| 10,495,095 | B2 * | 12/2019 | Auchoybur | F04D 29/321 |
| 10,718,216 | B2 | 7/2020 | Rockarts et al. | |
| 11,008,874 | B2 | 5/2021 | Kim | |
| 11,066,935 | B1 | 7/2021 | Stein et al. | |
| 11,421,542 | B2 | 8/2022 | Clark et al. | |
| 2013/0224040 | A1 * | 8/2013 | Straccia | F01D 5/20<br>416/242 |
| 2020/0182065 | A1 * | 6/2020 | Fredmonski | F04D 29/384 |
| 2025/0052160 | A1 * | 2/2025 | Mehrtens | F01D 5/141 |

* cited by examiner

TURBINE BLADE TIP GEOMETRY SYSTEM AND METHOD FOR GAS TURBINE ENGINE

TECHNICAL FIELD

The present disclosure generally relates to gas turbine engines, and more particularly relates to enhanced efficiency features including a blade/airfoil tip geometry that reduces losses by delaying the onset of vortex generation.

BACKGROUND

Gas turbine engines may be employed to power various devices. For example, a gas turbine engine may be used to power a mobile platform, such as aircraft, land vehicles, sea vehicles and other machines. Generally, gas turbine engines have an engine core, in which gas is combusted to generate a hot combustion gas flow. Gas turbine engines are generally used in a wide range of applications, such as for propulsion or as auxiliary power units. In a gas turbine engine, air is compressed in a compressor, and mixed with fuel and ignited in a combustor to generate hot combustion gases as a working fluid, which flow downstream into a turbine section. In a typical configuration, the turbine section includes rows of blades, such as stator vanes and rotor blades, disposed in an alternating sequence along the axial length of a generally annular hot gas flow path. Hot combustion gases are delivered from the engine combustor to the annular hot gas flow path, thus resulting in rotary driving of the rotor to provide an engine output.

Gas turbine rotor blade/airfoil tip leakage may be a source of inefficiencies in extracting work from the working fluid and may increase specific fuel consumption. Increased tip leakage may lead to increased heat loads, which when using cooling to reduce heat at the tips may also contribute to an increase in engine cycle loss.

Accordingly, it is desirable to provide improved blade/airfoil tip performance and durability. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a system for a gas turbine engine includes a rotor having a rotor blade that has a base, a tip, and an outer surface defined by a leading edge, a trailing edge, a suction side wall, and a pressure side wall, all extending between the base and the tip. Geometry of the tip of the rotor blade has a contour that is directed first toward the suction side wall at the leading edge, and then toward one of the pressure side wall or the suction side wall at the trailing edge. The geometry has a maintained or contracted shape that is shifted toward the suction side wall. The geometry is configured to reduce tip leakage interaction of the rotor to delay onset of tip vortex generation and desensitize the rotor to tip clearance.

In a number of additional embodiments, a method for reducing tip leakage interaction of a rotor to delay onset of tip vortex generation of a gas turbine engine and desensitize the rotor to tip clearance, the method includes forming the rotor to have a rotor blade that has a base, a tip, and an outer surface defined by a leading edge, a trailing edge, a suction side wall, and a pressure side wall, all extending between the base and the tip. Geometry of the tip of the rotor blade is designed to have a contour that is directed first toward the suction side wall of the tip at its leading edge, and then toward the pressure side wall or the suction side wall at the trailing edge. Geometry of the tip is simultaneously designed to have a maintained or contracted shape that is shifted toward the suction side wall.

In a number of other embodiments, a system for a gas turbine engine includes a shroud defining a gas path. A rotor has a rotor blade and disposed to rotate in the shroud about an axis in a direction of rotation. The rotor blade extends in a radial direction from a base closest to the axis to a tip furthest from the axis. The rotor blade extends for a span from 0% span at the base to 100% span at the tip. The rotor blade has a profile that has a leading edge and a trailing edge where the leading edge is forward from the trailing edge in the direction of rotation. The profile of the rotor blade includes a pressure side wall and a suction side wall joined to the pressure side wall at the leading edge and at the trailing edge. The pressure side wall and the suction side wall extend from the base to the tip and together define an outer surface of the rotor blade. The outer surface of the rotor blade has a substantially consistent profile contour in the radial direction from the base (0% span) to approximately a 90% span point. From the approximately 90% span point to the tip, the outer surface departs from the substantially consistent profile contour and has, adjacent the leading edge around the suction side wall and the pressure side wall adjacent the leading edge, an offset contour so that the tip is disposed at a location offset in a direction generally toward the suction side, relative to a projection of the substantially consistent contour to the tip, as a reference. The offset contour is configured to reduce tip leakage interaction of the rotor to delay the onset of a tip vortex generation and desensitize the rotor to a clearance between the tip and the shroud.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
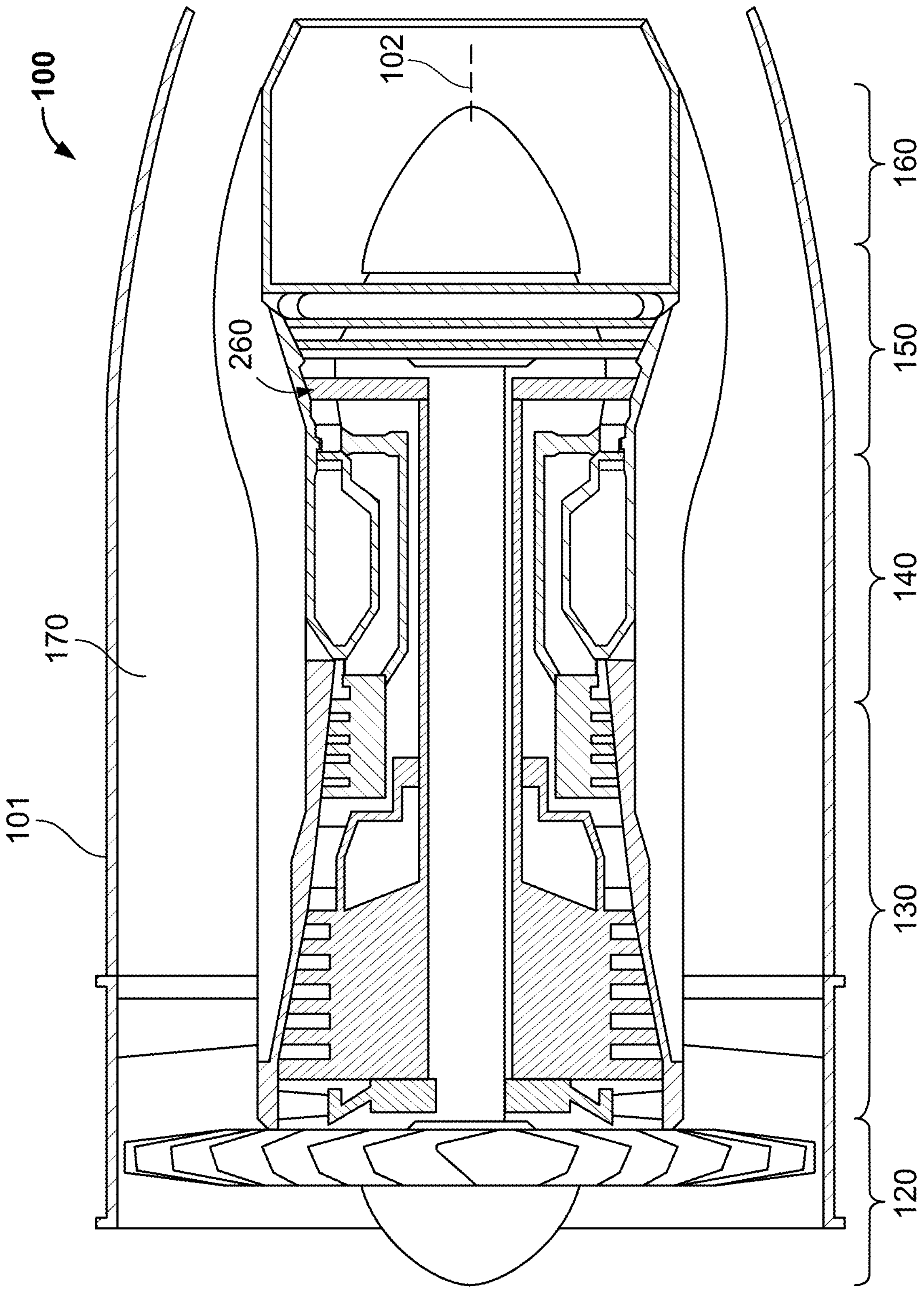
FIG. 1 is a schematic, cross sectional illustration of a gas turbine engine, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Referring to FIG. 1, a schematic illustration shows a gas turbine engine 100 according to an exemplary embodiment. Although FIG. 1 depicts a turbofan engine, in general, exemplary embodiments discussed herein may be applicable to any type of turbomachinery, including turboshaft engines, turboprop engines, and auxiliary power units. The gas turbine engine 100 may form part of a propulsion system for an aircraft but the current disclosure is not limited to aircraft applications. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed in from the fan section 120. The compressors may direct the compressed air into the combustion section 140. In the combustion section 140, the high pressure air is mixed with fuel and combusted. The combusted air is then directed into the turbine section 150. The turbine section 150 may include a series of stator and rotor assemblies disposed in axial flow series and include a number of rotor blades 260. Each rotor blade 260 is a series of stacked airfoil sections to form the rotor blade 260. The combusted air from the combustion section 140 expands through the rotor and stator assemblies and causes the rotor assemblies to rotate about an axis 102 for energy extraction. The air/gas is then exhausted through a propulsion nozzle disposed in the exhaust section 160 to provide additional forward thrust.

Figure 2:
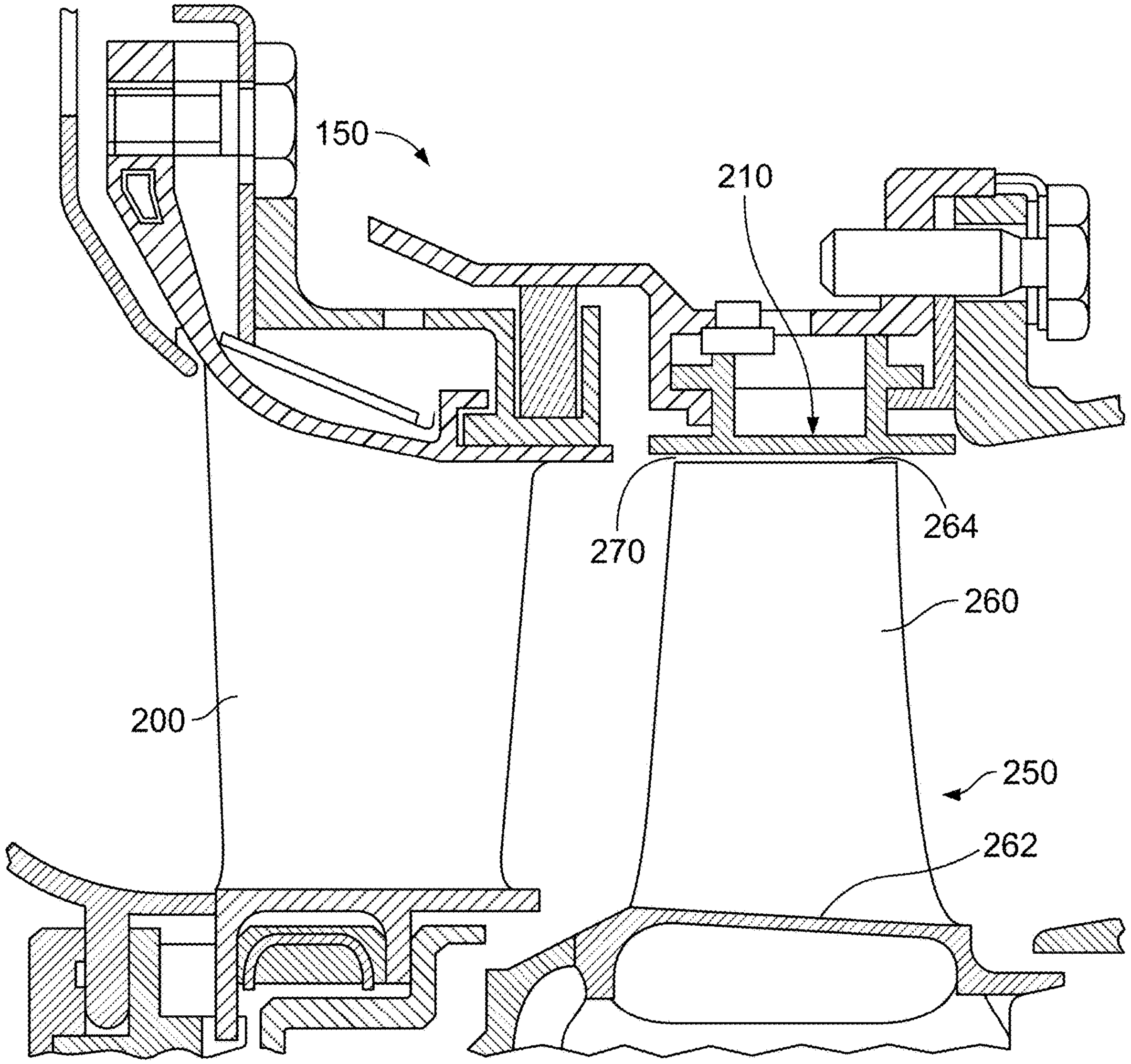
FIG. 2 is a schematic, fragmentary, cross sectional illustration of a part of the gas turbine engine of FIG. 1, according to an exemplary embodiment.

FIG. 2 is a fragmentary, sectional view of an area of the turbine section 150 of an engine, such as the turbine section 150 of engine 100 of FIG. 1 in accordance with an exemplary embodiment. FIG. 2 shows one stage of the turbine section 150. The turbine section 150 includes a turbine stator 200 and a turbine rotor 250 surrounded by a shroud 210 defining a gas flow path through which hot, combusted air from an upstream compressor section (e.g. compressor section 130 of FIG. 1) is directed. The cylindrical shroud 210 is disposed concentric to the rotor 250 to optimize aerodynamic efficiency and forms a radial gap (i.e., running clearance) 270 with an outermost diameter (tip 264) of the rotor 250. The radial gap 270 is typically very small, for example, in a range of about 0.25 millimeter (mm) to about 0.50 mm. In other embodiments, the radial gap 270 may be larger or smaller than these ranges. Although only one turbine stator 200 and one turbine rotor 250 are shown, such stators 200 and rotors 250 may be arranged in multiple alternating axially spaced, circumferential rows.

The rotor 250 generally includes rotor blades referred to herein as rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled. For example, the rotor blade 260 may be cooled as described in greater detail below.

The rotor blade 260 includes a base 262 at its radially inner end and a tip 264 at its radially outer end. Air/gas that moves through the gap 270 over the tip 264 may result in inefficiencies/losses. For example, a loss of overall engine performance may increase specific fuel consumption. Simultaneously, high temperature gas turbines such as the turbine rotor 250 may undergo significant transient conditions that load the area of the tip 264 with high heat and present a challenge to achieve acceptable blade life. Higher levels of tip leakage flow results in higher heat load which leads to higher tip metal temperatures and loss of blade life due to thermal stress. Increased tip leakage while using more cooling flow to achieve acceptable blade life may also contribute to an increase in engine cycle loss. As described herein, systems and methods mitigate tip leakage flow, reduce tip vortex strength to improve stage efficiency, and enable improvement to cooling effectiveness and increase blade durability. Issues of performance and durability are addressed, and the geometric aspects of the rotor blade(s) 260 to reduce tip vortex strength is applicable to cooled and uncooled applications.

Figure 3:
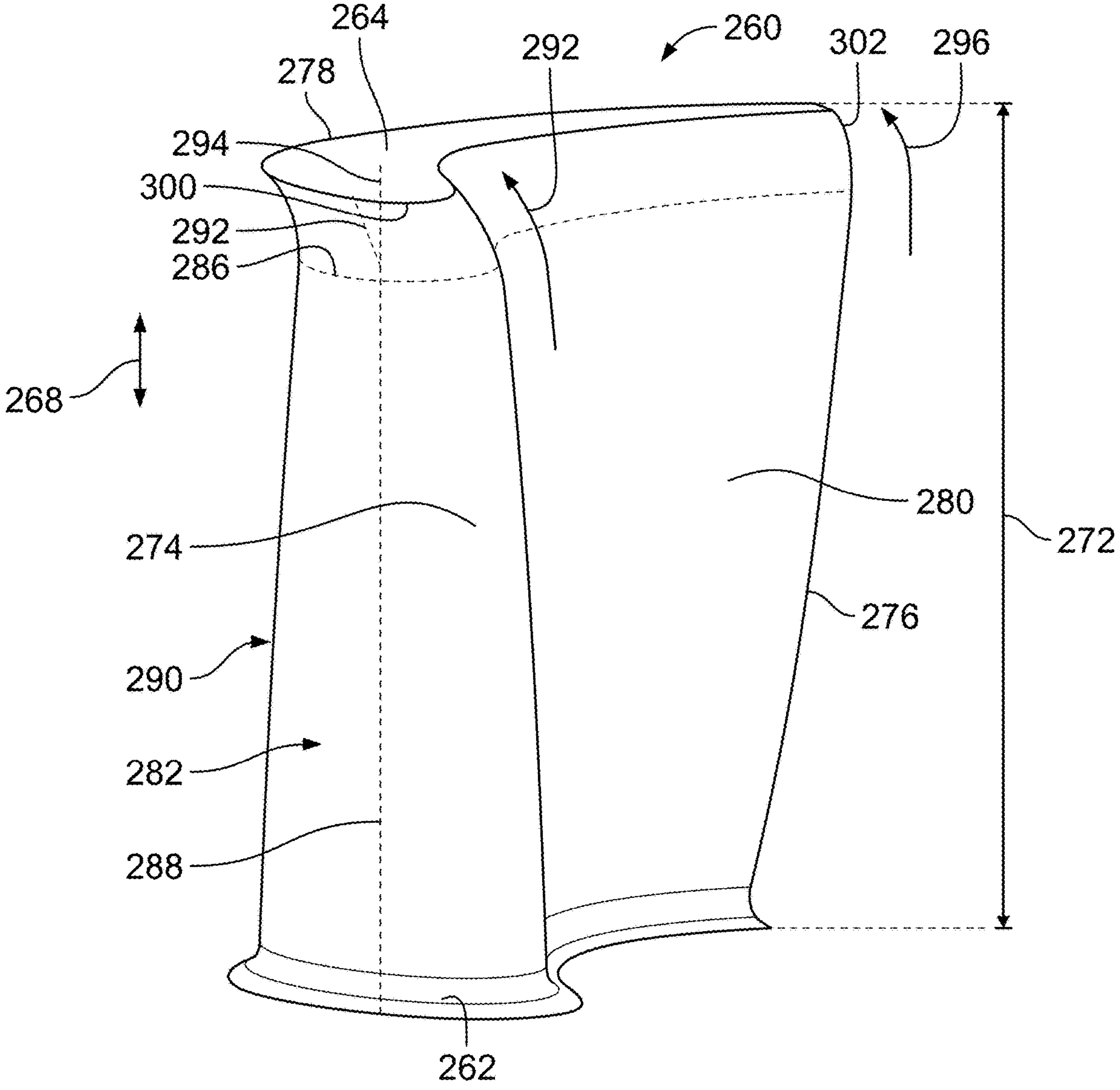
FIG. 3 is a perspective illustration of one rotor blade of the gas turbine engine of FIGS. 1 and 2, according to an exemplary embodiment.

Referring to FIG. 3, the rotor blade 260 is shown in isolation and extends in the radial direction 268 from the base 262 to the tip 264. A cross section of the rotor blade 260 has an airfoil shape at any point along the span 272 from the base 262 to the tip 264. The rotor blade 260 is configured to rotate about the axis 102 (FIG. 1) and is defined from the base 262, which is closest to the axis 102, to the tip 264, which is furthest from the axis. The span 272 of the rotor blade 260 extends from 0% span at the base 262 to 100% span at the tip 264.

The profile of the rotor blade 260 has a leading edge 274 and a trailing edge 276, where the leading edge 274 is forward from the trailing edge 276 in the direction of rotation of the rotor blade 260. The leading edge 274 is the part at the front of the rotor blade 260 (upstream in the gas flow direction). The trailing edge 276 is the point at the rear of the rotor blade 260 (downstream in the gas flow direction). The leading edge 274 is where the gas flow enters the airfoil profile and the trailing edge 276 is where the gas flow leaves the airfoil profile.

The profile of the rotor blade 260 includes a suction side wall 278 (as a convex wall) and a pressure side wall 280 (as a concave wall) joined to the suction side wall 278 at the leading edge 274 and at the trailing edge 276. The suction side wall 278 is configured to generate a higher velocity and lower static pressure of the gas flow stream passing along the rotor blade 260 and the pressure side wall 280 is configured to generate a higher static pressure than the suction side wall 278. The pressure side wall 280 and the suction side wall 278 extend from the base 262 to the tip 264 and together define the outer surface 282 of the rotor blade 260. The profile of the rotor blade 260 (as defined by the outer surface 282) is curved from the leading edge 274 to the trailing edge 276 so the gas flow enters the profile in a certain direction and gets redirected to leaves the profile in another direction. The rotor blade 260 may be substantially straight along the span 272 or may have a general twist and/or a lean, depending on application requirements.

The outer surface 282 of the rotor blade 260 may have a substantially consistent profile contour in the radial direction 268 from the base 262 (0% span) to approximately 90% span 286. In the current embodiment, a reference line 288 on the outer surface 282 is a straight, or substantially straight, line along the outer surface 282 from 0% span to 90% span forming a substantially consistent profile contour 290. From approximately the 90% span 286 to the tip 264 (100% span), the outer surface 282 departs from the substantially consistent profile contour 290 and has, adjacent the leading edge 274 and around both of its sides on the pressure side wall 280 and the suction side wall 278, an offset contour 292 so that the tip 264 is disposed at a location offset in a direction generally toward the suction side wall 278, relative to a projection 294 of the substantially consistent profile contour 290 as a reference. Concurrently, in the current embodiment, the outer surface 282 adjacent the trailing edge 276 around both of its sides on the pressure side wall 280 and the suction side wall 278, has an offset contour 296 so that the tip 264 is disposed at a location in a direction generally toward the suction side wall 278.

Figure 4:
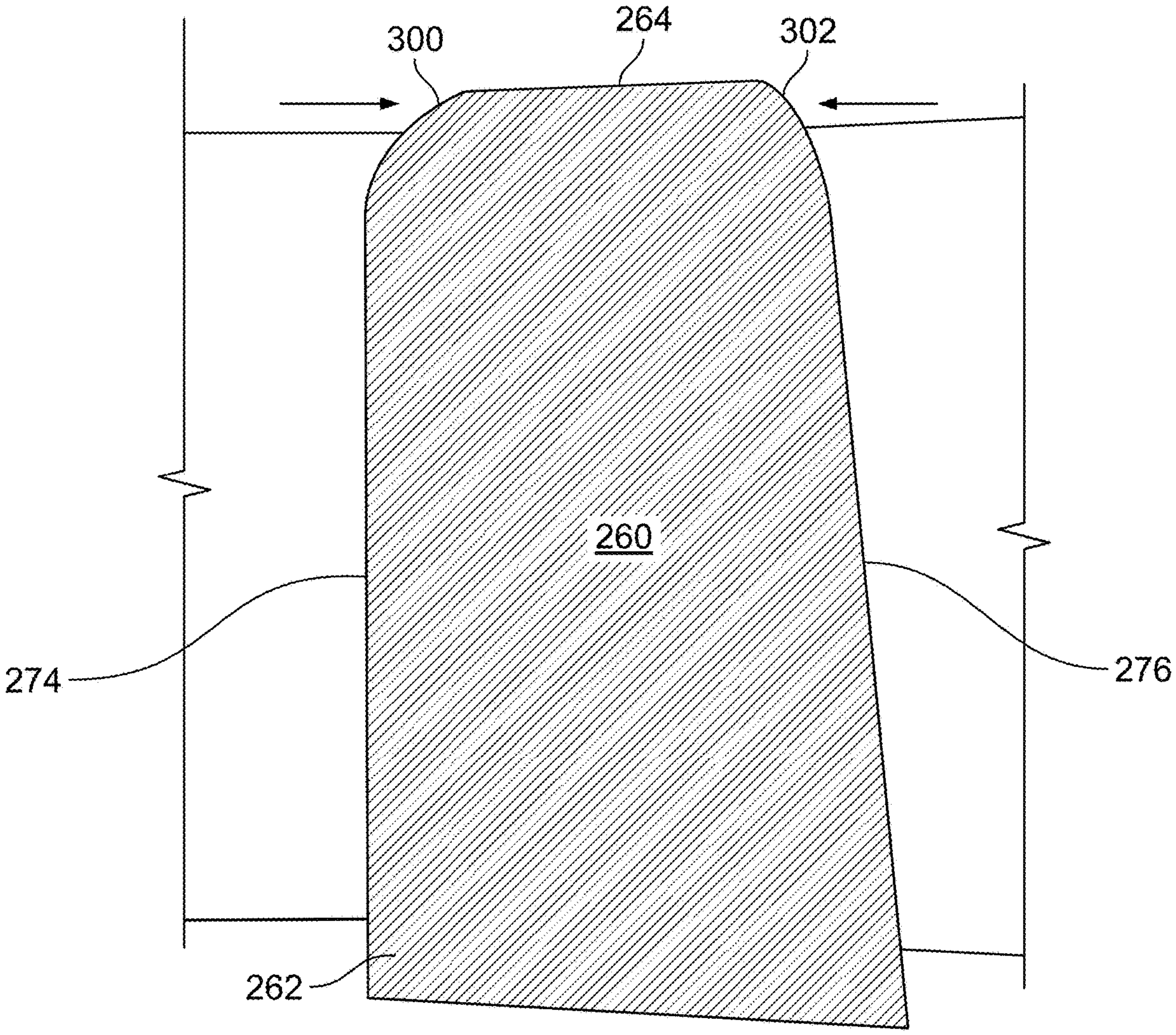
FIG. 4 is a cross sectional illustration of a part of the blade of FIG. 3, according to an exemplary embodiment.

As shown in the meridional view of FIG. 4, on the rotor blade 260 the tip 264 is contracted to reduce mechanical risk. In other words, at the leading edge 274 the rotor blade 260 has a rim 300 that curves inward (toward the trailing edge 276). In addition, at the trailing edge 276 the rotor blade 260 has a rim 302 that curves inward (toward the leading edge 274). The effect is that in the meridional view, the tip 264 is reduced in size due to the rim 300 and the rim 302.

The result of the offset contour 296 and the rims 300, 302, is that the rotor blade 260 and its tip 264 are configured to reduce tip leakage interaction. Differences in pressure create leakage over the tip 264, which creates vortexes. Onset of the tip vortexes is delayed due to the shift of the tip 264 toward the suction side wall 278, reducing pressure differences. Vortexes may contribute to inefficiencies and are therefore desirably minimized, which is accomplished due to the delay. The turbine rotor 250 is desensitized to tip clearance (the gap 270) by the design of the tip 264 which delays when vortexes begin to generate, and by the rims 300, 302. As shown in FIG. 3, the rotor blade 260 is designed with a geometry of the tip 264 to have an offset contour 292 that is directed toward the suction side wall 278 at the leading edge 274, and toward the suction side wall 278 at the trailing edge 276. The geometry of the tip 264 has the contracted shape that is overall shifted toward the suction side wall 278 around the leading edge 274 and around the trailing edge 276. The curve inward (contraction) is more pronounced on the leading edge 274 as compared to the trailing edge 276. The curve inward may be extended around other parts of the tip profile.

Figure 5:
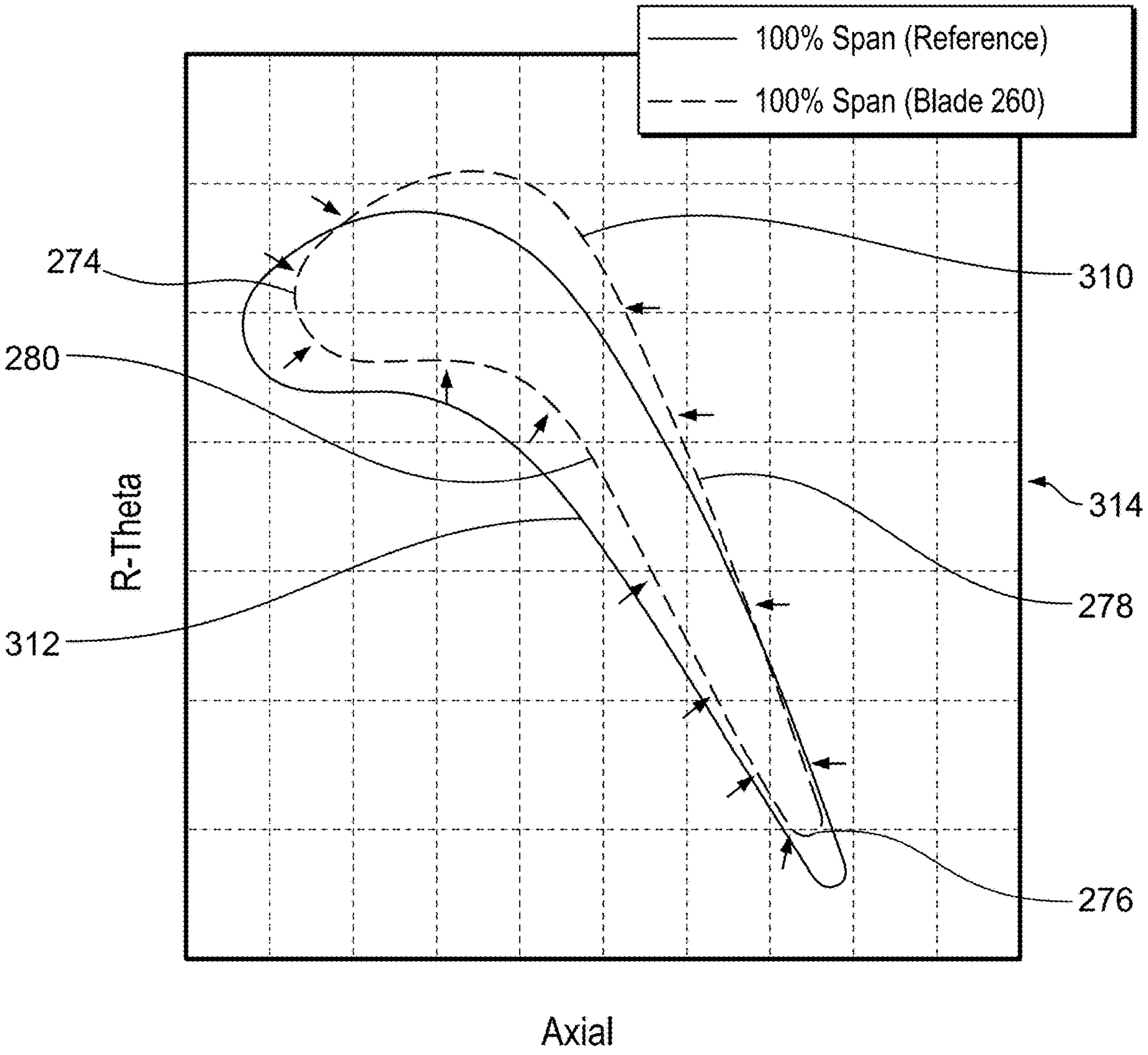
FIG. 5 is a chart showing tip offset of the airfoil of the rotor blade of FIGS. 3 and 4, according to an exemplary embodiment.

FIG. 5 charts a comparison between the profile 310 of the tip 264 of the rotor blade 260 and a reference profile 312 creating a representation as if the substantially consistent profile contour 290 were projected to the 100% span point without the offset contour 296. The profile 310 is shifted toward the suction side wall 278 and contracted, as compared to the reference profile 312. The profile 310 implements a localized tip contour shape that "shifts" the tip 264 tangentially and axially toward the suction side of the rotor blade 260. The shape of the profile 310 is also contracted, such as through the rim 300 and the rim 302 resulting in desirable aerodynamic behavior. This geometric configuration discourages leakage over the tip 264 and delays the onset of tip vortex generation thereby reducing vortex strength, while providing minimal mechanical risk since area is reduced. The geometric configuration provides the benefit of keeping flow on the pressure side (pressure side wall 280) of the rotor blade 260 separate from the flow on the suction side (suction side wall 278), by the physical "shift" in the rotor blade 260 between the 90% span 286 and the 100% span (tip 264). This delays the onset of tip vortex generation improving stage efficiency. An improvement in stage efficiency translates to an improvement in turbine efficiency, increased engine performance and decrease in specific fuel consumption. Tip vortexes are less pronounced in size resulting in decreased vortex strength. Tip vortexes are also less pronounced downstream and exhibit an increased tendency to re-attach.

Figure 6:
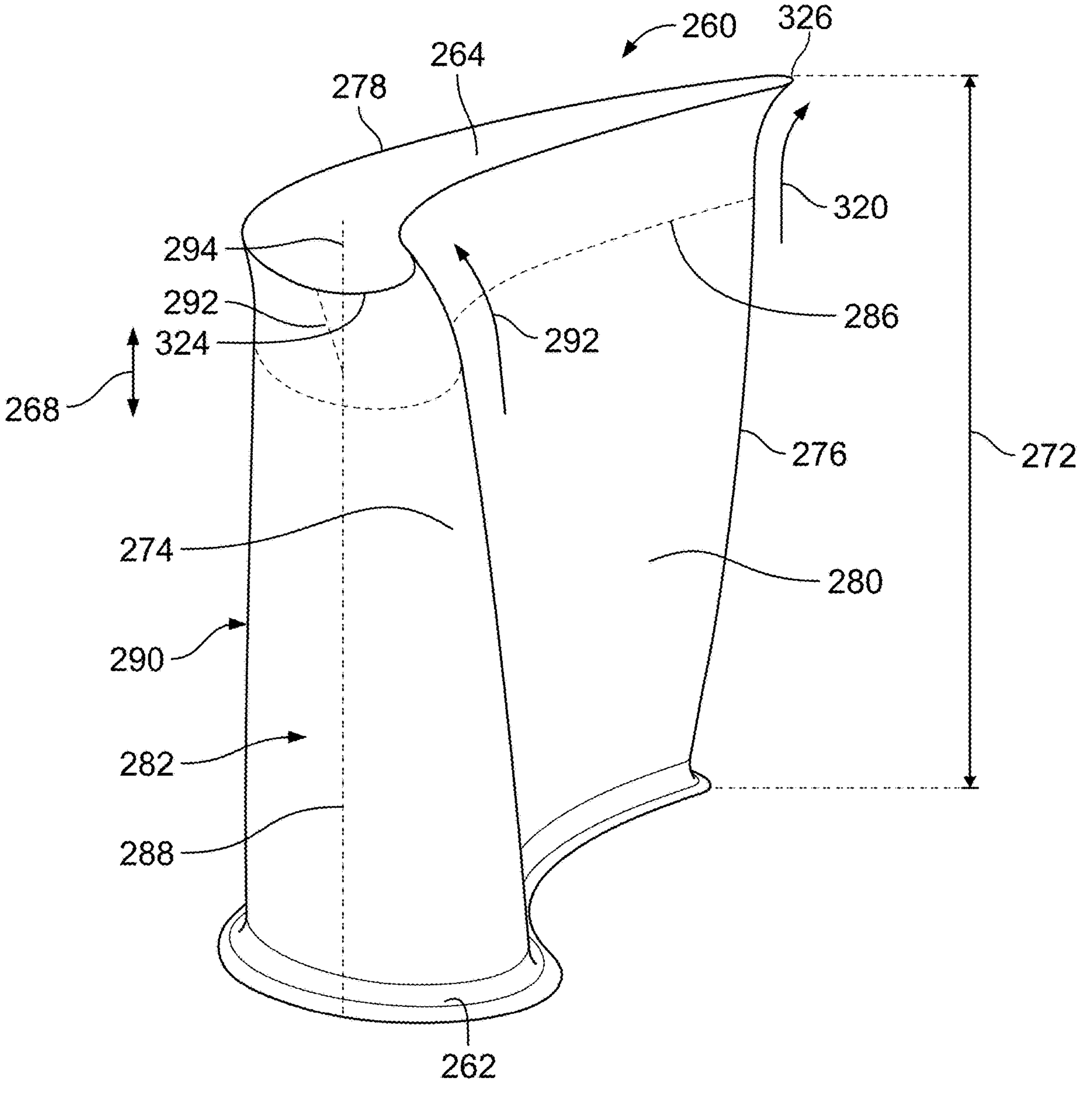
FIG. 6 is a perspective illustration of an alternative rotor blade of the gas turbine engine of FIGS. 1 and 2, according to an exemplary embodiment.

Referring to FIG. 6, another version of the rotor blade 260 also extends in the radial direction 268 from the base 262 to the tip 264 and is similar to the version of FIG. 3. From approximately the 90% span 286 to the tip 264 (100% span), the outer surface 282 departs from the substantially consistent profile contour 290 and has, adjacent the leading edge 274 and around both of its sides on the pressure side wall 280 and the suction side wall 278, the offset contour 292 so that the tip 264 is disposed at a location offset in a direction generally toward the suction side wall 278, relative to a projection 294 of the substantially consistent profile contour 290 as a reference. Concurrently, in the current embodiment, the outer surface 282 adjacent the trailing edge 276 around both of its sides on the pressure side wall 280 and the suction side wall 278, has an offset contour 320 so that the tip 264 is disposed at a location in a direction generally toward the pressure side wall 280.

Figure 7:
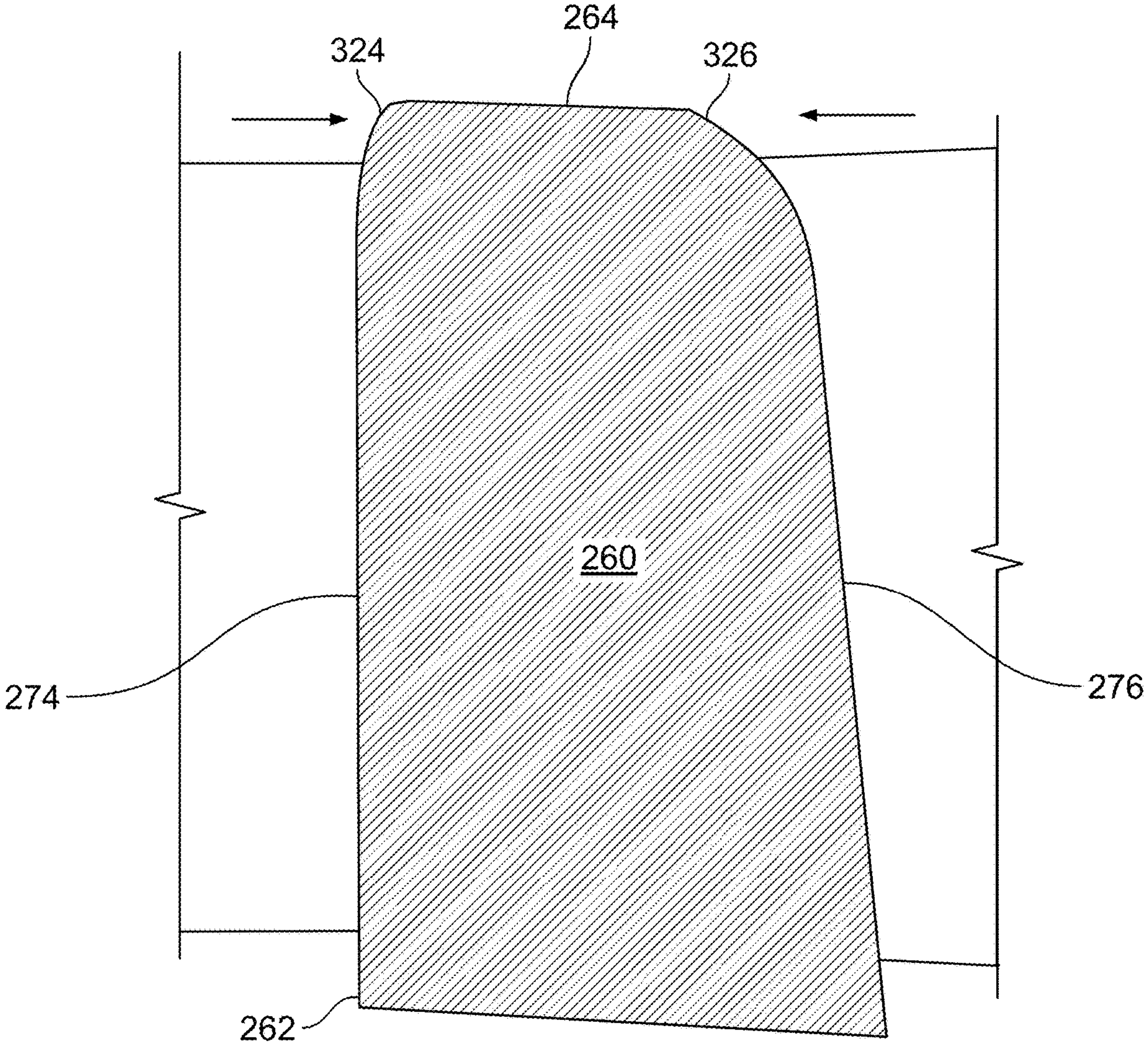
FIG. 7 is a cross sectional illustration of a part of the rotor blade of FIG. 6, according to an exemplary embodiment.

As shown in the meridional view of FIG. 7, at the leading edge 274 the rotor blade 260 has a rim 324 that curves inward (toward the trailing edge 276). In addition, at the trailing edge 276 the rotor blade 260 has a rim 326 that curves inward (toward the leading edge 274). The curve inward is more pronounced on the trailing edge 276 as compared to the leading edge 274. The curve inward may be extended around other parts of the tip profile.

The result is that the rotor blade 260 and its tip 264 are configured to reduce tip leakage interaction. Onset of the tip vortexes is delayed due to the shift toward the suction side wall 278 around the leading edge 274. Once the vortex generation is delayed around the leading edge 274, shifting the tip 264 toward the pressure side wall 280 around the trailing edge 276 does not negate this benefit. The turbine rotor 250 is desensitized to tip clearance (the gap 270). The rotor blade 260 is designed with a geometry of the tip 264 to have an offset contour 292 that is directed toward the suction side wall 278 at the leading edge 274, and toward the pressure side wall 280 at the trailing edge 276. The geometry of the tip 264 has a resultant shape that is shifted toward the suction side wall 278 around the leading edge and toward the pressure side wall 280 around the trailing edge 276.

Figure 8:
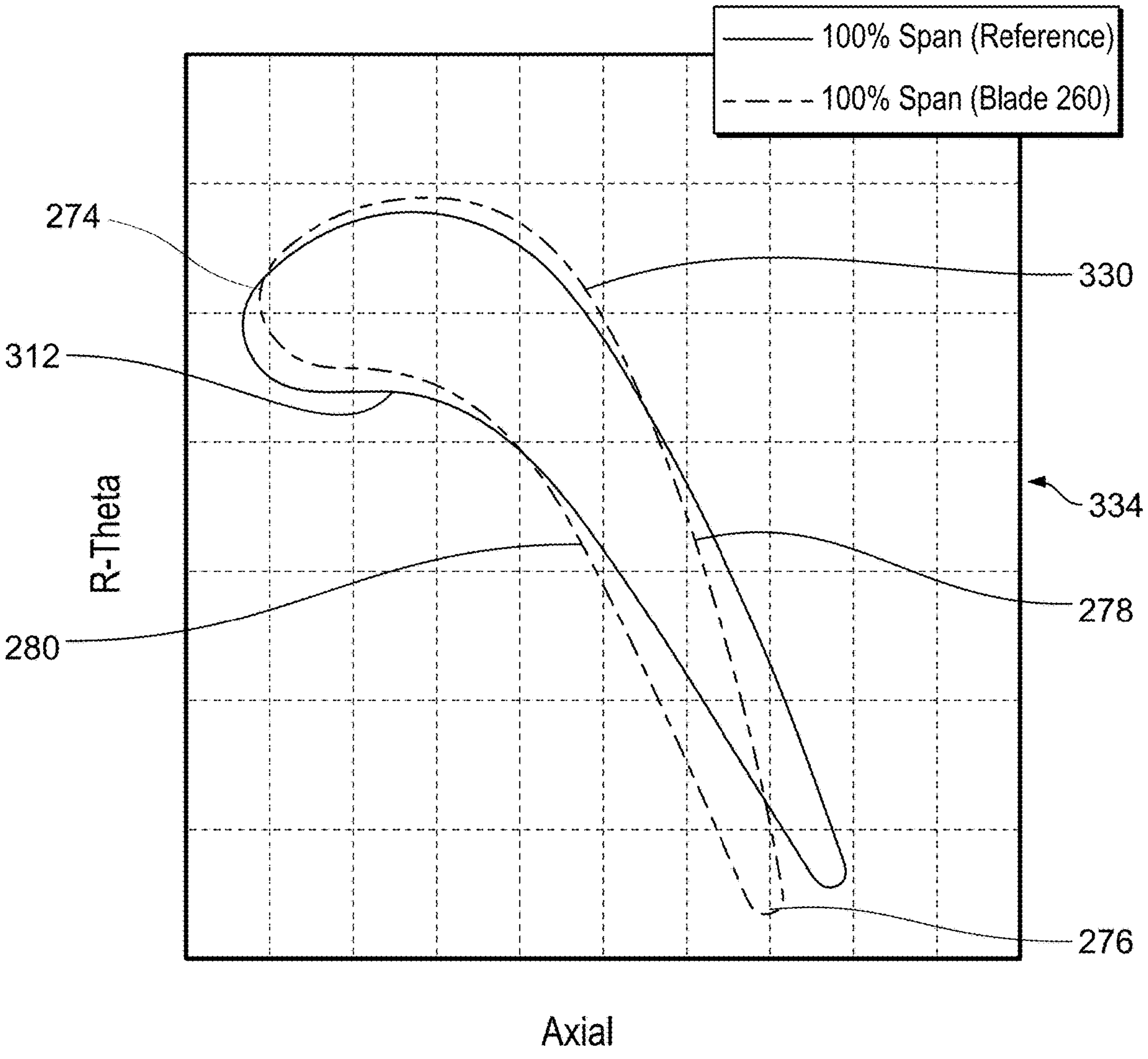
FIG. 8 is a chart showing tip offset of the airfoil of the rotor blade of FIGS. 6 and 7, according to an exemplary embodiment.

FIG. 8 charts a comparison between the profile 330 of the tip 264 of the rotor blade 260 and the reference profile 312 as if the substantially consistent profile contour 290 were projected to the 100% span point. The profile 330 is shifted toward the suction side wall 278 around the leading edge 274 and toward the pressure side wall 280 around the trailing edge 276. The profile 330 implements a localized tip contour shape that "shifts" the tip 264 tangentially and axially toward the suction side of the rotor blade 260 around the leading edge 274 and toward the pressure side around the trailing edge 276. This geometric configuration discourages leakage over the tip 264 and delays the onset of tip vortex generation thereby reducing vortex strength, while providing minimal mechanical risk since area is unaffected negatively. The geometric configuration provides the benefit of keeping flow on the pressure side (pressure side wall 280) of the rotor blade 260 separate from the suction side (suction side wall 278), flow as much as possible by the physical shift in the rotor blade 260 between the 90% span 286 and the 100% span (tip 264). This delays the onset of tip vortex generation improving stage efficiency. An improvement in stage efficiency translates to an improvement in turbine efficiency improvement, increased engine performance and decrease in specific fuel consumption.

Figure 9:
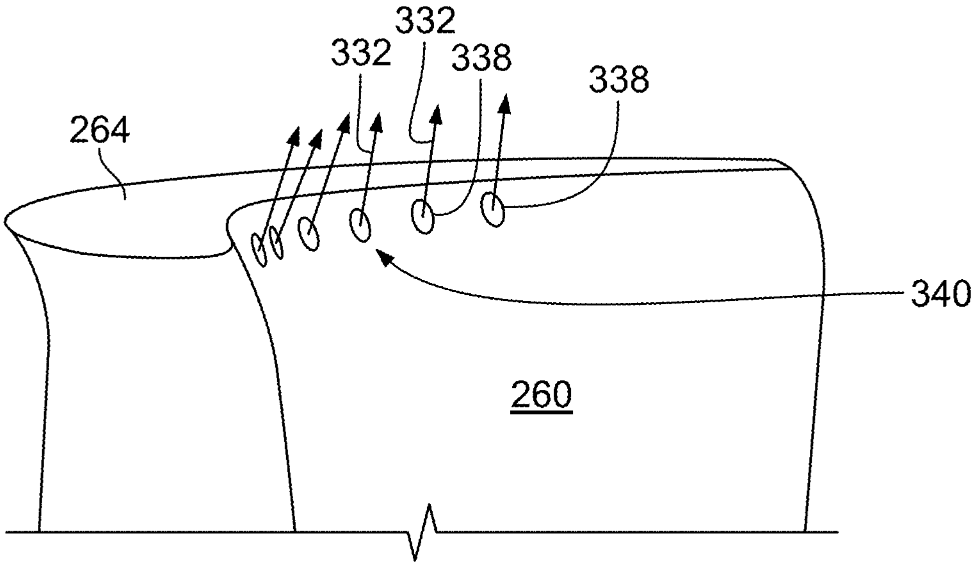
FIG. 9 is a fragmentary, perspective illustration of the rotor blade of FIG. 3 showing cooling features, according to an exemplary embodiment.

Referring to FIG. 9, for cooled turbine blades, such as rotor blade 260 of FIG. 3, the configuration of the tip 264 provides the benefit of being able to place cooling holes 338 solely in the fore region 340 of the tip 264 to enable beneficial cooling circulation. Cooling hole placement as shown in FIG. 9 provides mitigation of cooling hole clogging when the rotor blade 260 experiences transient cycle conditions and is prone to the tip 264 rub against the shroud 210. Cooling air discharge along the pressure side wall 280 near the tip 264 effects some tip recirculation improving cooling effectiveness, while maintaining mitigated tip leakage vortexes on the suction side. Cooling air 332 is ejected from the cooling holes 338 to oppose leakage flow to further help reduce leakage. The efficient use of cooling flow in this tip geometry allows for improved life of the rotor blade 260 and reduces engine specific fuel consumption in contrast to using more cooling flow distributed in other areas of the rotor blade 260 other than the fore region 340.

Figure 10:
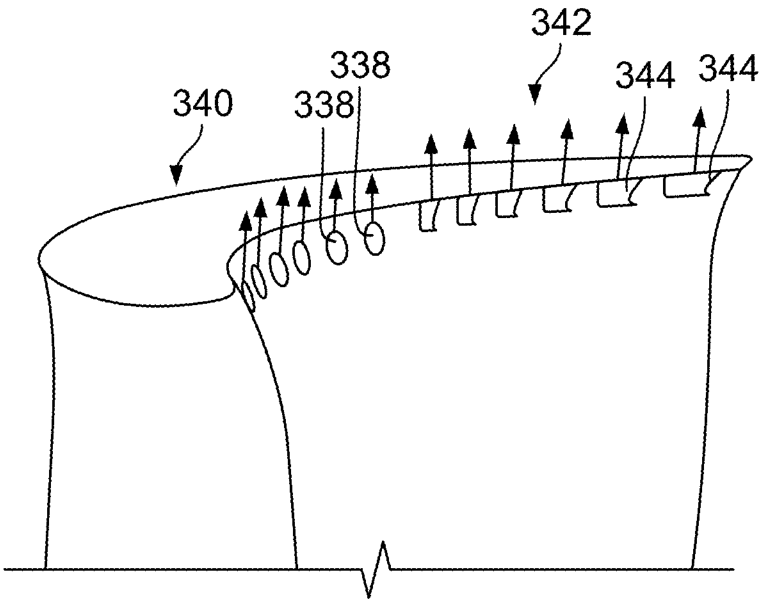
FIG. 10 is a fragmentary, perspective illustration of the rotor blade of FIG. 6 showing cooling features, according to an exemplary embodiment.

Referring to FIG. 10, in another cooled variant, such as rotor blade 260 of FIG. 6, the configuration of the tip 264 provides the benefit of being able to place cooling holes 338 in the fore region 340 of the tip 264 and in the rear region 342 of the tip 264 with cooling holes 344 to enable beneficial cooling circulation. Cooling air discharge along the pressure side wall 280 near the tip 264 effects some tip recirculation improving cooling effectiveness, while maintaining mitigated tip leakage vortexes on the suction side to help re-attachment. This efficient use of cooling flow in this tip geometry allows for improved life of the rotor blade 260.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for a gas turbine engine, comprising:

a rotor disposed within a shroud and having a rotor blade that has a base, a tip, and an outer surface defined by a leading edge, a trailing edge, a suction side wall, and a pressure side wall, all extending between the base and the tip, wherein a gap is defined between the tip and the shroud;

wherein a geometry of the rotor blade has a contour that includes a shift at the tip that is directed first toward the suction side wall at the leading edge, and then toward one of the pressure side wall or the suction side wall at the trailing edge;

wherein the tip has a contracted shape, meaning the rotor blade has an absence of material defining an inward curve from the pressure side wall to the tip and from the suction side wall to the tip resulting in a reduced profile area size of the tip compared to other parts of the turbine blade that are away from the tip;

wherein the geometry is configured to facilitate:

avoiding, by the shift, both leakage over the tip through the gap and an onset of tip vortex generation in the gap;

keeping, by the shift, a first flow along the pressure side wall of the rotor blade separate from a second flow along the suction side wall of the rotor blade;

providing, by the contracted shape, and by the reduced profile area size, and by extending the inward curve around a profile of the rotor blade, and by the inward curve being different at the leading edge as compared to the trailing edge, mechanical integrity of the rotor blade; and desensitizing, by the contour and by the contracted shape, the rotor to tip clearance in the gap, meaning vortex strength in the gap is reduced and inefficiencies are avoided by the avoided leakage over the tip and by the delay in the onset of the tip vortex generation in the gap.

2. The system of claim 1, wherein the outer surface has a substantially consistent contour extending from the base toward the tip, wherein the outer surface, adjacent the leading edge and around the suction side wall and the pressure side wall adjacent the leading edge, has an offset contour so that the tip is disposed at a location offset in a direction generally toward the suction side wall, relative to a projection of the substantially consistent contour to the tip, as a reference.

3. The system of claim 1, wherein the outer surface has a substantially consistent contour extending from the base toward the tip, wherein the outer surface, adjacent the trailing edge and around the suction side wall and the pressure side wall adjacent the trailing edge, has an offset contour so that the tip is disposed at a location offset in a direction generally toward the suction side wall, relative to a projection of the substantially consistent contour to the tip, as a reference.

4. The system of claim 1, wherein the outer surface has a substantially consistent contour extending from the base toward the tip, wherein the outer surface, adjacent the trailing edge and around the suction side wall and the pressure side wall adjacent the trailing edge, has an offset contour so that the tip is disposed at a location offset in a direction generally toward the pressure side wall, relative to a projection of the substantially consistent contour to the tip, as a reference.

5. The system of claim 1, wherein the outer surface of the airfoil has a substantially consistent profile contour in the radial direction from the base (0% span) to approximately a 90% span point, wherein the tip is maintained or contracted in shape relative to the outer surface of the rotor blade from approximately the 90% span point to the tip, absent tip modification.

6. The system of claim 1, wherein a tip leakage path is defined over the tip and between the tip and the shroud, wherein the rotor blade includes cooling holes near the tip configured to eject cooling air in a direction opposing the tip leakage path.

7. The system of claim 1, wherein the geometry is shifted toward the suction side wall at the leading edge, and is shifted toward the pressure side at the trailing edge.

8. The system of claim 1, wherein the inward curve is greater at the leading edge as compared to the trailing edge.

9. The system of claim 1, wherein the shift is directed toward the pressure side wall at the trailing edge, wherein the shift directed toward the suction side wall at the leading edge is configured to delay the onset of the tip vortex generation in the gap, wherein the shift directed toward the suction side wall at the trailing edge is configured to maintain the delay of the onset of the tip vortex generation in the gap.

10. The system of claim 1, wherein the outer surface of the rotor blade has a substantially consistent profile contour in the radial direction from the base (0% span) to approximately a 90% span point, wherein the tip is maintained or contracted in size relative to the outer surface from approximately the 90% span point to the tip, absent tip modification, and the tip is curved away from the pressure side wall and toward the suction side wall relative to the outer surface from the base to the 90% span point.

11. A method for reducing tip leakage interaction of a rotor to delay onset of tip vortex generation of a gas turbine engine and desensitize the rotor to tip clearance, the method comprising:

forming the rotor to have a rotor blade that has a base, a tip, and an outer surface defined by a leading edge, a trailing edge, a suction side wall, and a pressure side wall, all extending between the base and the tip;

positioning the rotor within a shroud with a gap defined between the tip and the shroud;

designing a geometry of the rotor blade to have a contour that includes a shift at the tip that is directed first toward the suction side wall of the tip at its leading edge, and then toward one of the pressure side wall or the suction side wall at the trailing edge;

forming the rotor blade so that the tip has a contracted shape, meaning the rotor blade has an absence of material defining an inward curve from the pressure side wall to the tip and from the suction side wall to the tip resulting in a reduced profile area size of the tip compared to other parts of the turbine blade that are away from the tip;

avoiding, by the shift in the geometry, both leakage over the tip through the gap and an onset of tip vortex generation in the gap;

keeping, by the shift, a first flow along the pressure side wall of the rotor blade separate from a second flow along the suction side wall of the rotor blade;

providing, by the contracted shape, and by the reduced profile area size, and by extending the inward curve around a profile of the rotor blade, and by the inward curve being different at the leading edge as compared to the trailing edge, mechanical integrity of the rotor blade; and desensitizing, by the contour and by the contracted shape, the rotor to tip clearance in the gap, meaning vortex strength in the gap is reduced and inefficiencies are avoided by the avoided leakage over the tip and by the delay in the onset of the tip vortex generation in the gap.

12. The method of claim 11, wherein the outer surface has a substantially consistent contour extending from the base toward the tip, wherein the outer surface, adjacent the leading edge and around the suction side wall and the pressure side wall adjacent the leading edge, has an offset contour so that the tip is disposed at a location offset in a direction generally toward the suction side wall, relative to a projection of the substantially consistent contour to the tip, as a reference.

13. The method of claim 11, comprising forming the outer surface to have a substantially consistent contour extending from the base toward the tip, with the outer surface, adjacent the trailing edge and around the suction side wall and the pressure side wall adjacent the trailing edge, and to have an offset contour so that the tip is disposed at a location offset in a direction generally toward the suction side wall, relative to a projection of the substantially consistent contour to the tip, as a reference.

14. The method of claim 11, comprising forming the outer surface to have a substantially consistent contour extending from the base toward the tip, with the outer surface, adjacent the trailing edge and around the suction side wall and the pressure side wall adjacent the trailing edge, to have an offset contour so that the tip is disposed at a location offset in a direction generally toward the pressure side wall, relative to a projection of the substantially consistent contour to the tip as a reference.

15. The method of claim 11, comprising forming the outer surface of the rotor blade to have a substantially consistent profile contour in the radial direction from the base (0% span) to approximately a 90% span point, and forming the tip to have a maintained or contracted shape relative to the outer surface of the rotor blade from approximately the 90% span point to the tip, absent tip modification.

16. The method of claim 11, comprising defining a tip leakage path defined over the tip and between the tip and the shroud, and forming the rotor blade to include cooling holes near the tip to eject cooling air in a direction opposing the tip leakage path.

17. The method of claim 11, comprising forming the geometry to be shifted toward the suction side wall at the leading edge, and then shifted toward the pressure side at the trailing edge.

18. The method of claim 11, comprising forming the inward curve to be greater at the leading edge as compared to the trailing edge.

19. The method of claim 11, forming the outer surface of the rotor blade to have a substantially consistent profile contour in a radial direction from the base (0% span) to approximately a 90% span point, and forming the tip to be maintained or contracted in size from approximately the 90% span point to the tip, absent tip modification, and forming tip to be curved away from the pressure side wall and toward the suction side wall relative to the outer surface from the base to the 90% span point.

20. A system for a gas turbine engine, comprising:

a shroud defining a gas path; and a rotor having a rotor blade and disposed to rotate in the shroud about an axis in a direction of rotation, wherein a gap is defined between the tip and the shroud, wherein the rotor blade extends in a radial direction from a base closest to the axis to a tip furthest from the axis, the rotor blade extending for a span from 0% span at the base to 100% span at the tip, wherein the rotor blade has a profile that has a leading edge and a trailing edge where the leading edge is forward from the trailing edge in the direction of rotation, wherein the profile of the rotor blade includes a pressure side wall and a suction side wall joined at the leading edge and at the trailing edge, wherein the pressure side wall and the suction side wall extend from the base to the tip and together define an outer surface of the rotor blade, wherein the outer surface of the rotor blade has a substantially consistent profile contour in the radial direction from the base (0% span) to approximately a 90% span point, wherein from the approximately 90% span point to the tip, the outer surface departs from the substantially consistent profile contour and has, adjacent the leading edge around the suction side wall and the pressure side wall adjacent the leading edge, an offset contour that includes a shift at the tip so that the tip is disposed at a location offset in a direction generally toward the suction side, relative to a projection of the substantially consistent contour to the tip, as a reference, and wherein the tip has a contracted shape, meaning the rotor blade has an absence of material defining an inward curve from the pressure side wall to the tip and from the suction side wall to the tip resulting in a reduced profile area size of the tip compared to other parts of the turbine blade that are away from the tip;

wherein the geometry is configured to facilitate:

avoiding, by the shift, both leakage over the tip through the gap and an onset of tip vortex generation in the gap;

keeping, by the shift, a first flow along the pressure side wall of the rotor blade separate from a second flow along the suction side wall of the rotor blade;

providing, by the contracted shape, and by the reduced profile area size, and by extending the inward curve around a profile of the rotor blade, and by the inward curve being different at the leading edge as compared to the trailing edge, mechanical integrity of the rotor blade; and desensitizing, by the contour and by the contracted shape, the rotor to tip clearance in the gap, meaning vortex strength in the gap is reduced and inefficiencies are avoided by the avoided leakage over the tip and by the delay in the onset of the tip vortex generation in the gap.

* * * * *